(12) United States Patent
Carr

(10) Patent No.: US 7,355,720 B1
(45) Date of Patent: Apr. 8, 2008

(54) OPTICAL DISPLACEMENT SENSOR

(75) Inventor: Dustin W. Carr, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 356 days.

(21) Appl. No.: 11/314,335

(22) Filed: Dec. 20, 2005

(51) Int. Cl.
*G01B 11/02* (2006.01)
(52) U.S. Cl. .................. 356/498; 356/499; 356/506
(58) Field of Classification Search ............... 356/521, 356/506, 486, 487, 488, 493, 494, 498, 499; 250/237 G
See application file for complete search history.

(56) References Cited

U.S. PATENT DOCUMENTS

| | | | |
|---|---|---|---|
| 5,978,401 A | 11/1999 | Morgan | |
| 6,483,619 B1 | 11/2002 | Greywall | |
| 6,567,572 B2 * | 5/2003 | Degertekin et al. | 250/237 G |
| 6,723,980 B2 * | 4/2004 | Lee | 250/237 G |
| 6,741,335 B2 * | 5/2004 | Kinrot et al. | 356/493 |
| 7,116,430 B2 * | 10/2006 | Degertekin et al. | 356/521 |
| 7,265,477 B2 * | 9/2007 | Wan | 359/223 |
| 2002/0039463 A1 * | 4/2002 | Degertekin et al. | 385/12 |
| 2004/0130728 A1 * | 7/2004 | Degertekin et al. | 356/505 |
| 2004/0202399 A1 * | 10/2004 | Kochergin et al. | 385/12 |
| 2005/0018541 A1 | 1/2005 | Johansen et al. | |
| 2005/0105098 A1 | 5/2005 | Johansen et al. | |
| 2006/0181712 A1 * | 8/2006 | Degertekin et al. | 356/505 |
| 2006/0192976 A1 * | 8/2006 | Hall et al. | 356/521 |
| 2007/0165896 A1 * | 7/2007 | Miles et al. | 381/356 |
| 2007/0272882 A1 * | 11/2007 | Ishihara et al. | 250/559.29 |

OTHER PUBLICATIONS

Frederick T. Chen et al, *Diffractive Lens Fabricated with Mostly Zeroth-order Gratings*, Optics Letters, vol. 21, No. 3, 1996, pp. 177-179.
Nykolai Bilaniuk, "Optical Microphone Transduction Techniques," Applied Acoustics, vol. 50, No. 1, 1997, pp. 35-63.
C. Arnone et al, "Fabrication of Diffractive Optics: Surface Reliefs and Artificial Dielectrics," Proceedings of the 20th Course of the International School of Quantum Electronics on Diffractive Optics and Optical Microsystems, 1996, in Erice, Sicily, Italy pp. 119-131.

(Continued)

*Primary Examiner*—Patrick J Connolly
(74) *Attorney, Agent, or Firm*—John P. Hohimer

(57) ABSTRACT

An optical displacement sensor is disclosed which uses a vertical-cavity surface-emitting laser (VCSEL) coupled to an optical cavity formed by a moveable membrane and an output mirror of the VCSEL. This arrangement renders the lasing characteristics of the VCSEL sensitive to any movement of the membrane produced by sound, vibrations, pressure changes, acceleration, etc. Some embodiments of the optical displacement sensor can further include a light-reflective diffractive lens located on the membrane or adjacent to the VCSEL to control the amount of lasing light coupled back into the VCSEL. A photodetector detects a portion of the lasing light from the VCSEL to provide an electrical output signal for the optical displacement sensor which varies with the movement of the membrane.

26 Claims, 8 Drawing Sheets

OTHER PUBLICATIONS

Dennis s. Greywall, "Micromachined Optical-interference Microphone", Sensors and Actuators, 1999, 75, pp. 257-268.

Rui Pu, et al, "Compaarison of techniques for bonding VCSELS directly to ICs," J. Opt. A: Pure Appl. Opt I (1999) pp. 324-329.

Neal A. Hall et al, "Self-Calibrating Micromachined Microphones with Integrated Optical Displacement Detection", The 11th International Conference on Solid State Sensors and Actuators, Munich, Germany, Jun. 10-14, 2001 pgs.

Darwin K. Serkland, et al "Monolithic Integration of Vertical-Cavity Surface-Emitting Lasers and Wavelength-Shifted Resonant-Cavity Photodetectors," Lasers and Electro-Optics Annual Meeting, LEDS Conference Proceedings, Nov. 2001, pp. 566-567.

Kent M. Geib, et al, "High Density Interleaved VCSEL-RCPD Arrays for Optical Information Processing", Proceedings of SPIE, vol. 4942 (2003) pp. 207-212.

B. G. Fismen, et al, "High Performance Los Cost Microphones Utilising Micro-optical Technology", Proceedings of 2003 IEEE International Conference on Optical MEMS, Aug. 18-21, 2003, pp. 59-60.

Hakon Sagberg, et al, "Optical Microphone Based on a Modulated Diffractive Lens", IEEE Photonics Technology Letters, vol. 15, No. 10, Oct. 2003, pp. 1431-1433.

Wook Lee et al, "Fabrication and Characterization of a Micromachined Acoustic Sensor with Integrated Optical Readout", IEEE Journal of Selected Topics in Quantum Electronics, vol. 10, No. 3, May/Jun. 2004, pp. 643-651.

Berit S. Avset et al, "Two MOEMS Microphone Designs for Acoustic Sensing Application," Mater. Res. Soc Symp. Spring Meeting Proc. vol. 883 (2005) pp. FF6.4.1-FF6.4.8.

* cited by examiner

OPTICAL DISPLACEMENT SENSOR

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to optical sensors, and more particularly to optical displacement sensors which have applications for use as optical microphones, optical pressure sensors, optical vibration sensors, and optical accelerometers.

BACKGROUND OF THE INVENTION

Optical displacement sensors are being developed for use as optical microphones, and can provide advantages over the conventional microphones in terms of increased sensitivity, increased frequency range, and reduced electronic noise. Previous optical displacement sensors have generally operated passively by measuring light directed through a Fabry-Perot interferometer, or from a reflective diffraction grating.

The present invention operates differently from previous optical displacement sensors in utilizing optical feedback into a vertical-cavity surface-emitting laser (VCSEL) from an optical cavity formed by a moveable membrane and an output mirror of the VCSEL. This results in the optical cavity of the VCSEL being coupled to the optical cavity formed by the moveable membrane and output mirror of the VCSEL. As a result, any movement of the membrane in response to sound, vibration, acceleration, etc., will produce a change in the lasing characteristics of the VCSEL, and in particular can change the intensity of a beam of lasing light produced by the VCSEL.

The present invention can reduce the effect of squeezed-film damping which is present in other types of optical displacement sensors which require a membrane to be located very close to an adjacent substrate. In the present invention, the membrane can be suspended above the VCSEL with a predetermined separation which can be as large as several millimeters. This greatly reduces any squeezed-film damping.

Many different embodiments of the optical displacement sensor of the present invention are possible which can be batch fabricated as single devices or as an array of devices.

These and other advantages of the present invention will become evident to those skilled in the art.

SUMMARY OF THE INVENTION

The present invention relates to an optical displacement sensing apparatus which comprises a vertical-cavity surface-emitting laser (VCSEL) further comprising a first optical cavity with an active region therein to produce a beam of lasing light; a membrane located proximate to the VCSEL to receive the beam of lasing light and to reflect a portion of the beam of lasing light back into the VCSEL through an output mirror of the VCSEL, with the membrane and the output mirror forming a second optical cavity which is coupled to the first optical cavity to produce a change in intensity of the beam of lasing light in response to a displacement of the membrane; and a photodetector to detect the change in intensity of the beam of lasing light from the VCSEL and to generate therefrom an electrical output signal which varies with the displacement of the membrane. The second optical cavity has a cavity length which can be, for example, in the range of 0.1-3 millimeters (mm).

The membrane, which is generally substantially planar and suspended on a substrate, can comprise a material selected from the group of materials consisting of silicon dioxide, silicon nitride, silicon, metals, polymers and combinations thereof.

The membrane in certain embodiments of the present invention can comprise a diffractive lens structure formed on one side of the membrane. The membrane can also include a metal coating formed over the diffractive lens structure, or alternately on a side of the membrane opposite the diffractive lens structure.

The VCSEL can be located on another substrate which can be attached to the substrate containing the membrane. The photodetector can be located on the same substrate as the VCSEL, or on a side of the membrane opposite the VCSEL. When the photodetector is located on the same substrate as the VCSEL, the photodetector can comprise an annular photodetector at least partially surrounding the VCSEL.

The present invention also relates to an optical displacement sensing apparatus which comprises a VCSEL having a first optical cavity with an active region therein to produce a beam of lasing light. A light-reflective diffractive lens is located proximate to the VCSEL to receive the beam of lasing light and to reflect a portion of the beam of lasing light back into the VCSEL through an output mirror of the VCSEL, with the light-reflective diffractive lens and the output mirror forming a second optical cavity which is coupled to the first optical cavity. This produces a change in intensity of the beam of lasing light in response to any displacement of the light-reflective diffractive lens. A photodetector is provided in the apparatus to detect the change in intensity of the beam of lasing light from the VCSEL and to generate therefrom an electrical output signal which varies with the displacement of the light-reflective diffractive lens.

The light-reflective diffractive lens can comprise a membrane having a diffractive lens structure formed on one side of the membrane. The membrane can further include a metal coating formed over the diffractive lens structure or on a side of the membrane opposite the diffractive lens structure to enhance the reflectivity thereof. The membrane can be formed from silicon dioxide, silicon nitride, silicon, a metal, a polymer, or a combination thereof.

The membrane can be suspended on a substrate, and the VCSEL located on another substrate so that two substrates can be attached together either directly or with an intervening spacer. As previously described, the photodetector can be located on the same substrate as the VCSEL (e.g. as an annular photodetector at least partially surrounding the VCSEL), or can be located on a side of the light-reflective diffractive lens opposite the VCSEL.

The present invention further relates to an optical displacement sensing apparatus which comprises a light-reflective diffractive lens formed on a substrate; a vertical-cavity surface-emitting laser (VCSEL) further comprising a first optical cavity with an active region therein to produce a beam of lasing light, with the VCSEL being located on the substrate proximate to the light-reflective diffractive lens; a membrane suspended above the VCSEL to receive the beam of lasing light and to reflect a portion of the beam of lasing light to the light-reflective diffractive lens and therefrom back into the VCSEL through an output mirror of the VCSEL, with the light-reflective diffractive lens and the membrane and the output mirror together forming a second optical cavity which is coupled to the first optical cavity to produce a change in intensity of the beam of lasing light in response to a displacement of the membrane; and a photodetector to detect the change in intensity of the beam of lasing light from the VCSEL and to generate therefrom an electrical output signal which varies with the displacement of the membrane.

The membrane can comprise a material selected from the group of materials consisting of silicon dioxide, silicon nitride, silicon, metals, polymers and combinations thereof. The membrane can be suspended on another substrate which is attached to the substrate containing the light-reflective diffractive lens.

The photodetector can be located beneath the light-reflective diffractive lens on the substrate containing the light-reflective diffractive lens. In certain embodiments of the present invention, the photodetector can comprise a segmented photodetector having a plurality of independently-contacted photodetector segments.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
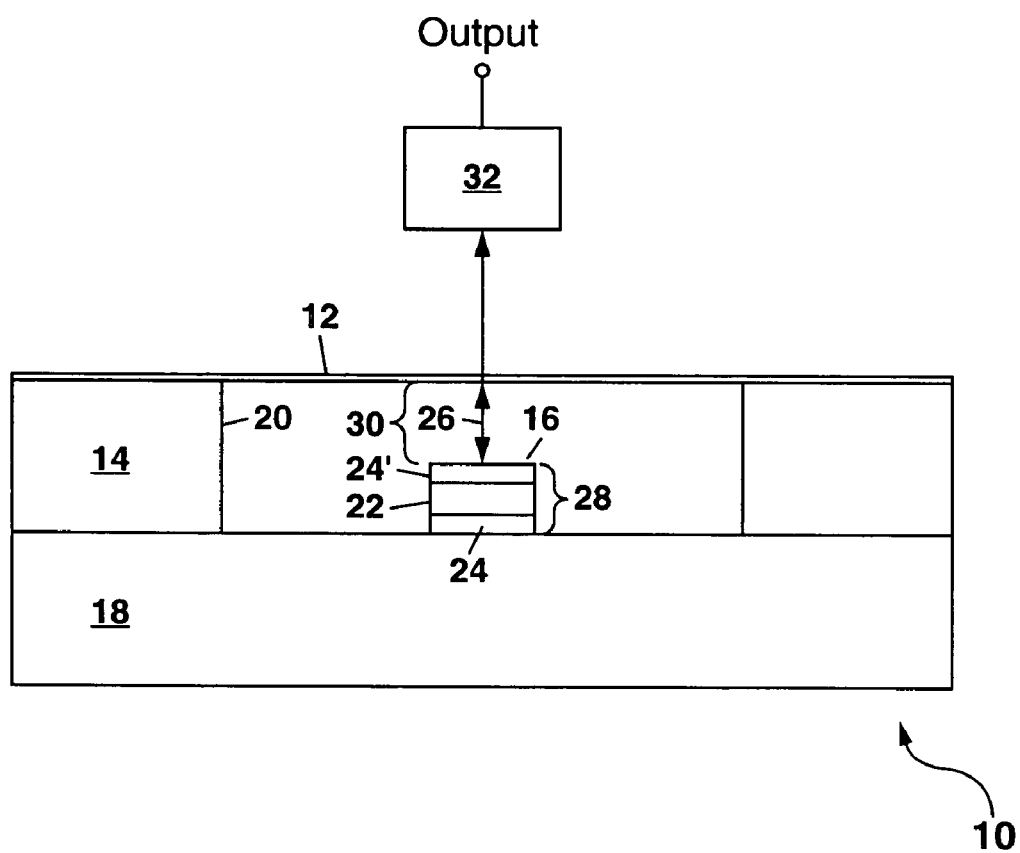
FIG. 1 shows a schematic cross-section view of a first example of the optical displacement sensing apparatus of the present invention.

Referring to FIG. 1, there is shown a schematic cross-section view of a first example of the optical displacement sensing apparatus 10 (also referred to herein as an optical displacement sensor) of the present invention. The apparatus 10 comprises a membrane 12 (also termed a diaphragm) suspended on a first substrate 14 above a vertical-cavity surface-emitting laser (VCSEL) 16 which is supported on a second substrate 18.

The membrane 12 is light-reflective and is preferably substantially planar. The membrane 12 can comprise, for example, silicon dioxide, silicon nitride, silicon (either monocrystalline silicon or polycrystalline silicon), a metal (e.g. aluminum), a polymer (e.g. polyimide, mylar, TEFLON), or a combination thereof. As an example, the membrane can comprise silicon nitride with a layer thickness of 0.5-10 microns ($\mu m$) overcoated on one side thereof with a layer of metal (e.g. aluminum or gold) 30-100 nanometers (nm) thick to enhance the reflectivity of the membrane 12.

In the example of FIG. 1, the membrane 12 can be formed on a silicon substrate 14 after initially preparing the silicon substrate 14 by forming a layer of a thermal oxide about 0.6 $\mu m$ thick over the entire silicon substrate 14. This can be done using a conventional thermal oxidation system which exposes the silicon substrate 14 to a moist or oxygen-containing ambient at an elevated temperature (e.g 1050° C. for about 1.5 hours) to convert a surface portion of the substrate 14 to silicon dioxide. After formation of the thermal oxide layer, a layer of silicon nitride can be blanket deposited over the substrate 14 using low-pressure chemical vapor deposition (LPCVD) at about 850° C. The silicon nitride layer can be, for example, 0.8 $\mu m$ thick.

After deposition of the silicon nitride layer, the substrate 14 can be photolithographically patterned to form an etch mask on a backside of the substrate 14 opposite where the silicon nitride membrane 12 will be formed. An opening 20 can be etched completely through the substrate 14 to the thermal oxide layer. This can be done using an isotropic or anisotropic wet etchant, or alternately by dry etching using a plasma. The opening 20 can be, for example, 1 mm in diameter.

As an example, the opening 20 can be formed with substantially vertical sidewalls by using a deep anisotropic plasma etching process which has been termed a Bosch etch process. The Bosch etch process is disclosed in U.S. Pat. No. 5,501,893 to Laermer, which is incorporated herein by reference. This Bosch etch process combines multiple anisotropic etching steps with steps for simultaneously depositing an isotropic polymer/inhibitor to minimize lateral etching thereby allowing the opening 20 to be etched through the substrate 14 while retaining substantially uniform lateral dimensions (i.e. straight sidewalls). The shape of the opening 20 can be circular, elliptical, polygonal or arbitrary shaped depending upon a predetermined shape for the membrane 12 to be formed over the opening 20.

Once the opening 20 is formed, the thermal oxide layer beneath the membrane 12 can be removed using a selective wet etchant comprising hydrofluoric acid (HF). A light-reflective layer of metal (e.g. aluminum or gold) up to about 100 nm thick can then be deposited on one side of the membrane 12 (e.g. on a side of the membrane 12 facing the VCSEL 16). If needed, a thin layer (e.g. 10-20 nm) of titanium or chromium can be deposited over the membrane 12 as an adhesion layer prior to depositing the light-reflective layer of aluminum or gold.

In the example of FIG. 1, the VCSEL 16 comprises an active region 22 sandwiched between a pair of distributed Bragg reflection (DBR) mirrors 24 and 24' which further comprise a plurality of alternating high-refractive-index and low-refractive-index layers. In a GaAs VCSEL emitting near 850 nanometers, the high-refractive-index layers can comprise GaAs, and the low-refractive-index layers can comprise AlGaAs or AlAs. The active region 22 of the VCSEL 16 includes a semiconductor p-i-n junction which includes one or more quantum wells. Electrical activation of the VCSEL produces a beam 26 of lasing light which is emitted through one of the mirrors which is termed an output mirror (e.g. the mirror 24' in FIG. 1). The VCSEL 16 can be either a multi-mode VCSEL, or a single-mode VCSEL. Generally, a multi-mode VCSEL 16 is preferred for the optical displacement sensor 10 since this type of VCSEL 16 has a larger lasing emission aperture which simplifies alignment of the two cavities 28 and 30. Furthermore, the presence of multiple lasing modes in the multi-mode VCSEL provides a higher output power and allows a better control of the VCSEL's lasing characteristics in the presence of optical feedback from the second optical cavity 30.

The VCSEL 16, which can be procured commercially in chip form, can be attached to the substrate 18 which can contain electrical wiring to supply an electrical current to the VCSEL 16 for operation thereof. The electrical wiring can be connected to contact pads which can be used to make external electrical connections to the optical displacement sensing apparatus 10. The contact pads can be located on the same side as the VCSEL 16, or on the opposite side of the substrate 18 (e.g. using electrical vias through the substrate 18).

The substrate 18 can comprise a semiconductor substrate (e.g. a silicon or silicon-on-insulator substrate), or a ceramic substrate. The VCSEL 16 can be attached to the substrate 18 using eutectic bonding (e.g. using a gold/tin solder preform), or alternately using an adhesive such as a conductive or non-conductive epoxy, or polyimide. The substrate 18 can optionally include integrated circuitry for controlling operation of the VCSEL. Techniques for bonding VCSELs directly to substrates containing integrated circuitry are well-known in the art (see e.g. Pu et al., "Comparison of Techniques for Bonding VCSELs Directly to ICs," *Journal of Optics A: Pure Applied Optics*, vol. 1, pp. 324-329, 1999). The two substrates 14 and 18 can then be attached together (e.g. with an adhesive, or by eutectic bonding) to form the completed device 10.

In the example of FIG. 1, the VCSEL 16 has a first optical cavity 28 formed by the mirrors 24 and 24' surrounding the active region 22. A second optical cavity 30 is formed by the light-reflective membrane 12 and the output mirror 24' of the VCSEL 16. These two cavities 28 and 30 are coupled together since the beam 26 of the lasing light from the VCSEL 16 is reflected off the membrane 12, with a portion of the beam 26 being directed back into the VCSEL 16 through the output mirror 24' as indicated by the double-headed arrow in FIG. 1. As a result, any displacement of the membrane 12 upwards or downwards towards the VCSEL 16 will change a cavity length of the first optical cavity 28; and this will, in turn, produce a change in the lasing characteristics of the VCSEL 16 which can be manifested as a change in the intensity of the beam 26 emitted from the VCSEL 16.

When the portion of the beam 26 of the lasing light which is reflected off the membrane 12 and directed back into the VCSEL 16 is in phase with the lasing light emitted from the VCSEL 16, the intensity of the beam 26 from the VCSEL 16 will increase; and when the reflected portion is 180° out-of-phase with the lasing light emitted from the VCSEL 16, the intensity of the beam 26 emitted from the VCSEL 16 will decrease. This change from being in-phase to being out-of-phase will occur as the membrane 12 is deflected over a distance of one-quarter of the wavelength of the lasing light ($\lambda/4$). Further deflection of the membrane 12 can produce a cyclic change in the intensity of the beam 26 of the lasing light with a period being equal to one-half wavelength (i.e. $\lambda/2$). The optical displacement sensor 10 can be biased at a predetermined operating point by controlling an electrical current which is used to activate the VCSEL 16, or by controlling the temperature of the VCSEL 16. This can allow operation of the device 10 in a regime where the intensity of the lasing light from the VCSEL 16 varies linearly or quasi-linearly with the displacement of the membrane 12 over a certain range of displacement.

In the example of FIG. 1, the change in intensity of the beam 26 of lasing light resulting from movement of the membrane 12 can be detected with a photodetector 32 which can be located on a side of the membrane 12 opposite the VCSEL 16. The photodetector 32 can be a conventional photodetector which is responsive to the wavelength of the beam 26 of the lasing light produced by the VCSEL. As an example, when the VCSEL 16 emits at a wavelength near 0.85 µm, the photodetector 32 can comprise a silicon photodetector 32.

The photodetector 32 provides an electrical output signal which contains information about the displacement of the membrane 12. When the apparatus 10 is used as an optical microphone, the electrical output signal will provide a signal containing any sound (i.e. vibrations) detected by the optical microphone. When the apparatus 10 is used as a pressure sensor, the electrical output signal will vary with changes in pressure on the membrane 12. When the apparatus 10 is used as an acceleration sensor (e.g. with an optional mass being located on the membrane 12, if needed, for increased sensitivity), the electrical output signal will vary with the magnitude and direction of any acceleration or deceleration sensed by the apparatus 10.

In the example of FIG. 1, the space between the membrane 12 and the underlying substrate 18 can be sealed, or alternately one or more openings can be provided through the membrane 12 or through one of the substrates 14 and 18, or through an optional spacer placed between the substrates 14 and 18. When the space between the membrane 12 and the substrate 18 is sealed, squeezed-film damping will generally not be a problem due to the relatively large cavity length of the second optical cavity 30 which can be, for example, 0.1-0.4 millimeters. In other embodiments of the optical displacement sensor 10, the second optical cavity 30 can have a cavity length which can be up to 3 millimeters, or more.

Figure 2:
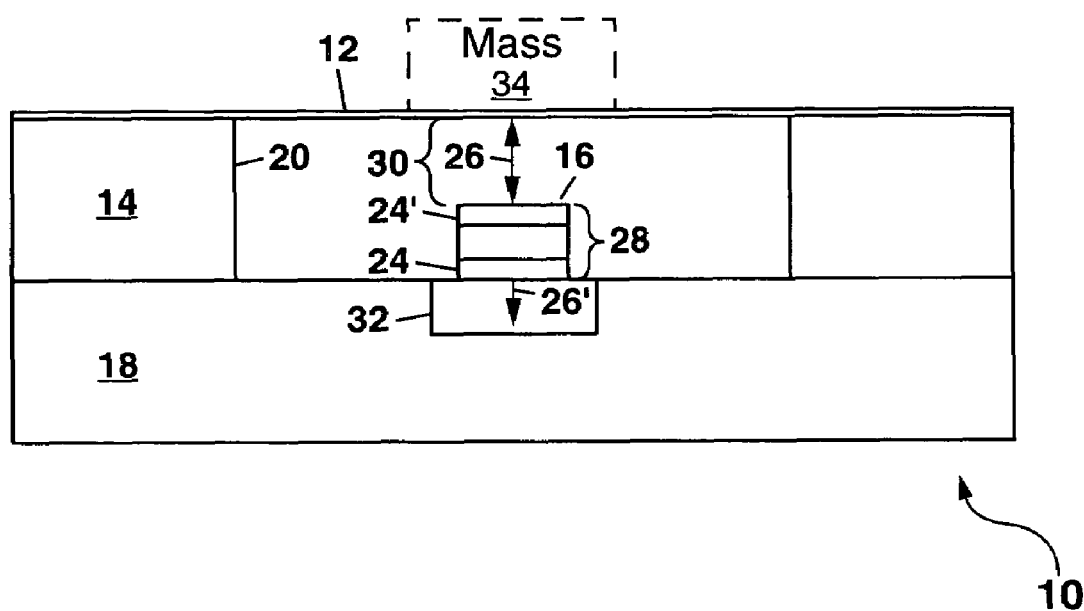
FIG. 2 shows a schematic cross-section view of a second example of the optical displacement sensing apparatus of the present invention.

FIG. 2 shows a schematic cross-section view of a second example of the optical displacement sensing apparatus 10 of the present invention. This example of the optical displacement sensor 10 is similar to that of FIG. 1 except that the photodetector 32 is formed in the substrate 18 beneath the VCSEL 16 to detect the intensity of a beam 26' the lasing light which is emitted through a partially-transmitting bottom mirror 24 of the VCSEL 16. The intensity of the beam 26' will change in the same way as the intensity of the beam 26, which was previously described with reference to FIG. 1, whenever the membrane 12 moves due to a sensed sound, vibration, pressure change or acceleration. When the substrate 18 comprises silicon, the photodetector 32 can comprise a diffused or epitaxially-grown silicon p-n or p-i-n junction as known to the art.

In other embodiments of the present invention, when the substrate 18 comprises a transparent material (e.g. glass, fused silica, sapphire, etc.), the photodetector 32 can be attached to a backside of the substrate 18 opposite the VCSEL 16, with the beam 26' of the lasing light being transmitted through the substrate 18. In yet other embodiments of the present invention, when the substrate comprises an opaque material (e.g. ceramic), a hole can be made (e.g. laser drilled) through the opaque substrate 18 beneath the VCSEL 16 to allow the beam 26' to propagate through the substrate 18 to a photodetector 32 which can be attached to the backside of the substrate 18 (e.g. with epoxy or solder). Such a hole through the substrate 18 can be made prior to attaching the VCSEL 16 and the photodetector 32 to opposite sides of the substrate 18.

An advantage of locating the photodetector 32 beneath the VCSEL 16 is that this arrangement provides a more compact device 10 than that shown in FIG. 1, and also allows electrical connections to be made on the substrate 18 to both the VCSEL 16 and the photodetector 32. Additionally, when the substrate 18 includes integrated circuitry, the integrated circuitry can also be used to amplify or process the electrical output signal generated by the photodetector 32, and can even provide a feedback loop to adjust or stabilize the operation of the VCSEL 16 using an input provided by the electrical output signal from the photodetector 32. Stabilization of the VCSEL 16 by modulating an electrical drive current to the VCSEL 16 can be useful to avoid the onset of chaotic behavior which might otherwise result from the optical feedback into the VCSEL 16 by the second optical cavity 30 under certain operating conditions.

Another advantage of locating the photodetector 32 beneath the VCSEL 16 as shown in FIG. 2 is that an optional mass 34 can be added to the membrane 12 to increase its sensitivity to sensing an acceleration event. Additionally, the membrane 12 can be made totally reflecting (e.g. using a high-reflecting coating over a surface of the membrane 12) so that the lasing light is confined entirely within the optical displacement sensor 10.

Figure 3:
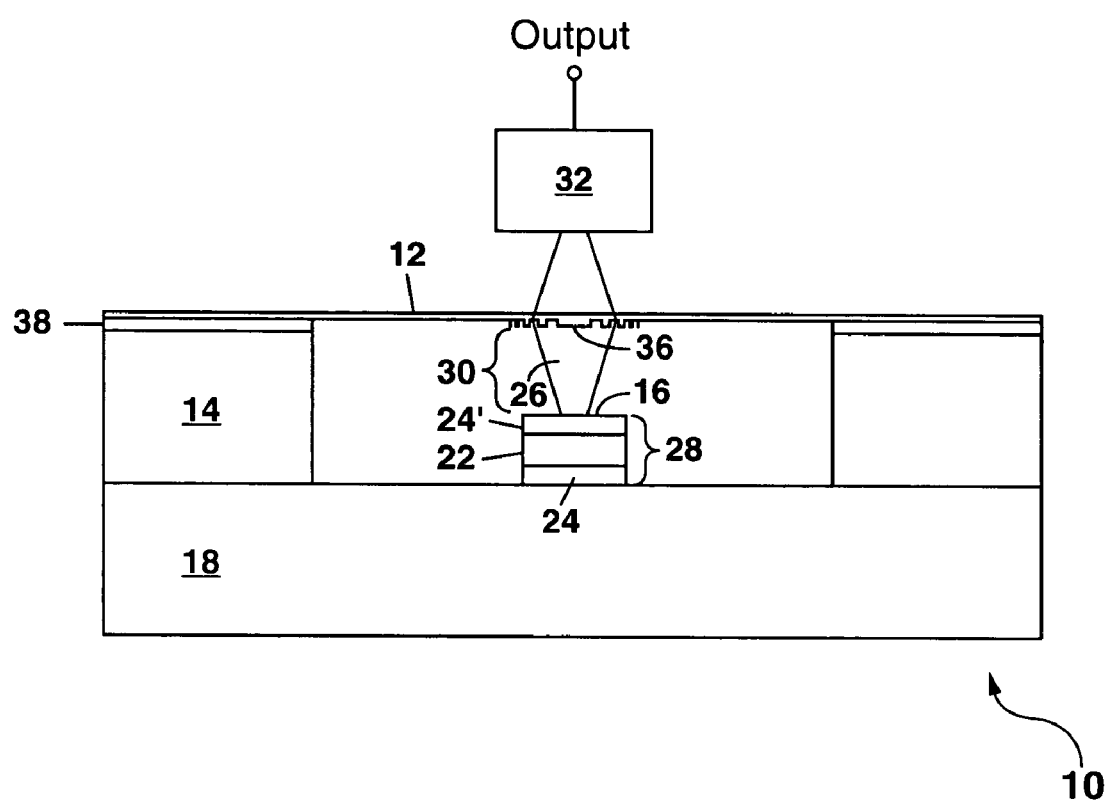
FIG. 3 shows a schematic cross-section view of a third example of the optical displacement sensing apparatus of the present invention.

FIG. 3 shows a schematic cross-section view of a third example of the optical displacement sensor 10 of the present invention. In the example of FIG. 3, a diffractive lens structure is provided on a surface of the membrane 12 to form a light-reflective diffractive lens 36. The light-reflective diffractive lens 36 is useful for focusing the portion of the beam 26 of the lasing light which is directed back into the VCSEL 16 to couple the two cavities 28 and 30 together. The provision of a diffractive lens 36 in the apparatus 10 allows the cavity length of the second optical cavity 30 to be extended beyond the length possible with a planar light-reflective membrane 12 as shown in FIGS. 1 and 2. A focal length of the light-reflective diffractive lens 36 and the cavity length of the second optical cavity 30 can be selected to provide a predetermined amount of optical feedback into the VCSEL 16 which can be, for example, about one-tenth of the intensity of the beam 26 of lasing light emitted by the VCSEL 16.

Although the beam 26 of lasing light is depicted herein as a set of straight lines, those skilled in the art will know that the beam 26 generally has a conical shape which is defined by the divergence of the lasing light when it is emitted from the output mirror 24' of the VCSEL 16. The divergence of the lasing light from the VCSEL 16 further depends upon the lateral dimensions of the lasing mode(s) in the VCSEL 16, and is generally larger for a single-mode VCSEL than for a multi-mode VCSEL. The portion of the beam 26 which is reflected off the diffractive lens 36 will, in general, also have a conical shape which will depend upon the focusing qualities of the diffractive lens 36 (i.e. the focal length of the lens 36 and its location relative to the VCSEL 16).

The diffractive lens structure, which forms the light-reflective diffractive lens 36, comprises a plurality of spaced-apart circular or elliptical rings which can have a binary profile, a multilevel profile, or a continuous profile. A light-reflective metal coating is also provided on one side of the membrane 12 to reflect a portion of the beam 26 of the lasing light back into the VCSEL 16.

Fabrication of a binary light-reflective diffractive lens 36 will now be described with reference to FIGS. 4A-4F.

Figure 4A:
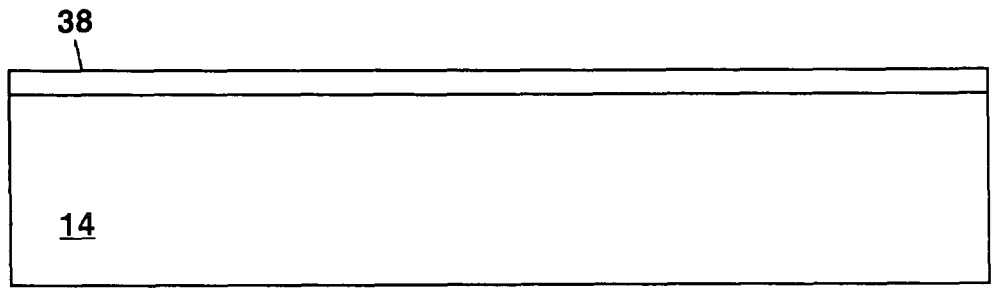
FIGS. 4A-4F show in schematic cross-section view a series of process steps which can be used to form a light-reflective diffractive lens on the membrane in the device of FIG. 3.

In FIG. 4A, a silicon substrate 14 is initially prepared by forming a layer 38 of a thermal oxide as previously described, or alternately by blanket depositing the layer 38 using silicon dioxide or a silicate glass (e.g. a silicate glass deposited from the decomposition of tetraethylortho silicate, also termed TEOS, by low-pressure chemical vapor deposition at about 750° C. and densified by a high temperature processing). The layer 38 can be, for example, up to about 1 μm thick with the exact thickness of the layer 38 being at least as thick as the binary diffractive lens structure to be formed.

Figure 4B:
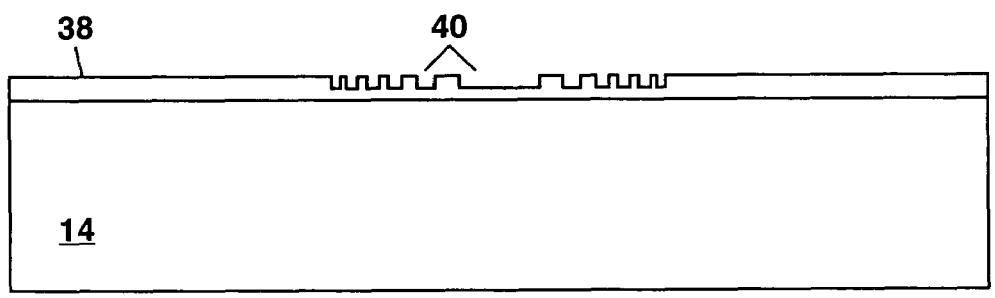

In FIG. 4B, a photolithographically defined mask (not shown) can be formed over the layer 38 using well-known semiconductor integrated circuit processes. The layer 38 can then be etched (e.g. using reactive ion etching) to define a plurality of annular recesses 40 which have the shape (e.g. circular) of the diffractive lens structure to be formed in the membrane 12. For a binary diffractive lens structure, the etch depth into the layer 38 will generally be $\lambda/4n$ where $\lambda$ is the wavelength of the lasing light from the VCSEL 16, and n is the index of refraction of the material used to form the membrane 12. For a silicon nitride membrane with n=2 and a VCSEL operating wavelength $\lambda$=850 nm, the etch depth into the layer 38 will be about 106 nm.

Figure 4C:
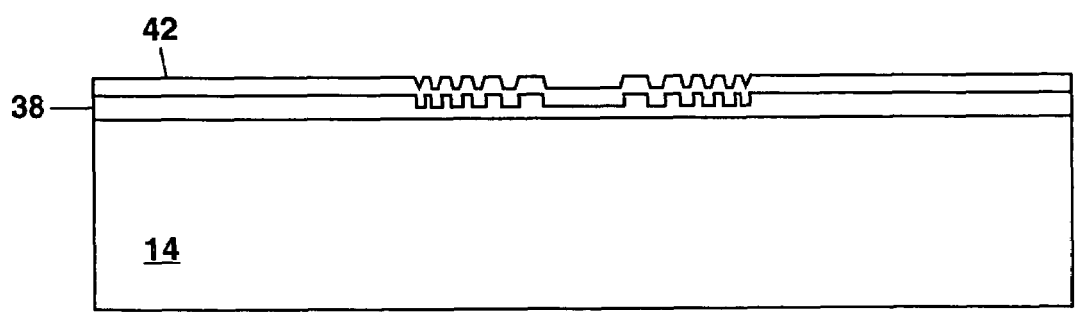

In FIG. 4C, a layer 42 of silicon nitride or polycrystalline silicon (also termed polysilicon) can be blanket deposited over the layer 38 by chemical vapor deposition. When silicon nitride is used to form the layer 42, it can be deposited by LPCVD at about 850° C. When polysilicon is used to form the layer 42, it can be deposited by LPCVD at a temperature of about 580° C. The deposited layer 42 will fill in the annular recesses 40 and can result in an irregular surface topography as shown in FIG. 4C.

Figure 4D:
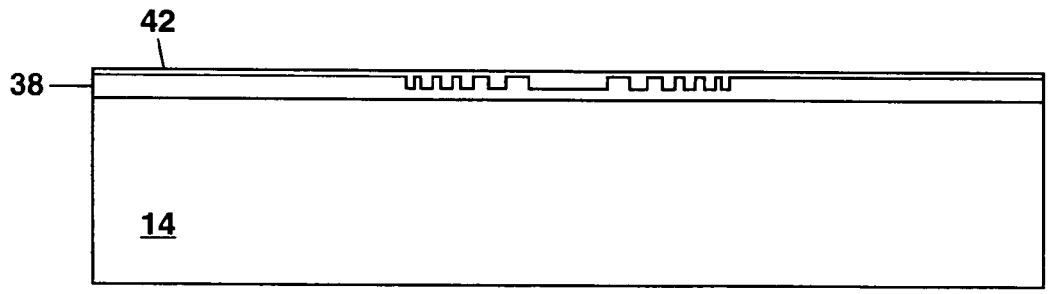

In FIG. 4D, a planarization step can be used to planarize the layer 42 and to precisely adjust the thickness of the layer 42. This can be done by mechanical or chemical-mechanical polishing as known to the art. In some cases, the planarization step can be omitted, for example, when the thickness and planarity of the membrane 12 do not need to be precisely controlled, or when the lasing light is not being transmitted through the membrane 12.

Figure 4E:
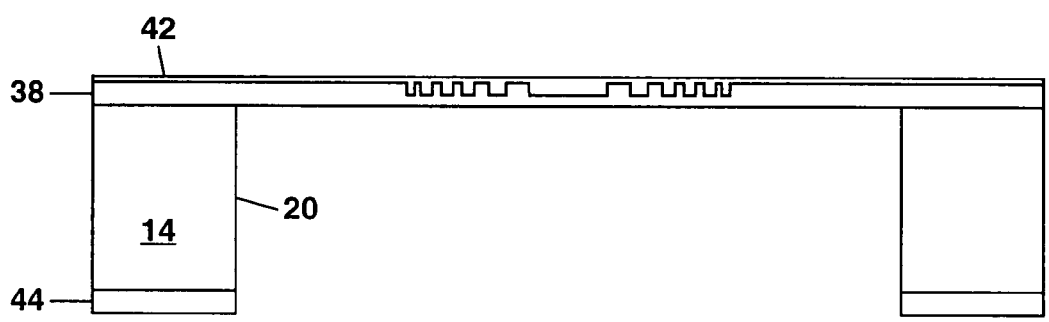

In FIG. 4E, a mask 44 can be formed on the backside of the substrate 12 with a photolithographically-defined opening through which an opening 20 in the substrate 12 can be etched down to expose the layer 38. As previously described, the opening 20 can be formed by a Bosch etching step. The opening 20 formed by the Bosch etching step will define the shape of the membrane 12 and will expose a portion of the layer 38 which can then be removed to complete formation of the membrane 12.

Figure 4F:
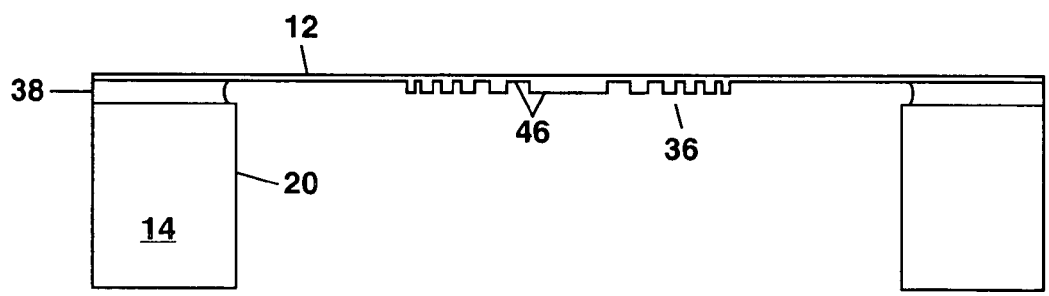

In FIG. 4F, a wet etching step using a selective wet etchant comprising HF can be used to remove the exposed portion of the layer 38. The HF etchant is an isotropic etchant and can produce a slight lateral etching of the layer 38 comparable to the thickness of the layer 38. The selective HF etchant will not substantially chemically attack the silicon substrate 14 or the silicon nitride layer 42 used to form the membrane 12.

Figure 5:
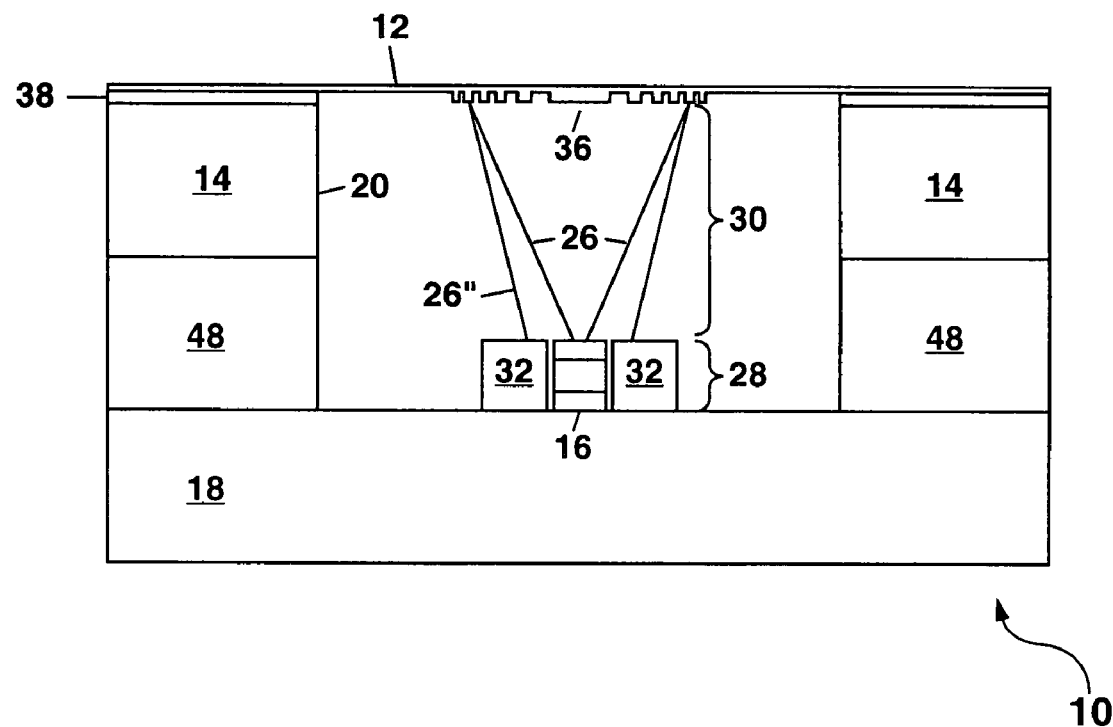
FIG. 5 shows a schematic cross-section view of a fourth example of the optical displacement sensing apparatus of the present invention.

A light-reflective metal coating 46 can be deposited over the diffractive lens 36 as shown in FIG. 4F, or alternately on a side of the membrane 12 opposite the diffractive lens 36. The metal coating 46 can comprise aluminum or gold with a layer thickness of 30-100 nm thick, with the exact layer thickness being dependent upon whether the diffractive lens 36 is to be partially transmitting as shown in FIG. 3, or totally reflecting as shown in FIG. 5.

In other embodiments of the present invention, a metal such as aluminum or gold, which are chemically resistant to HF, can be blanket deposited to form the layer 42 and processed in a manner similar to that described with reference to FIGS. 4A-4F. Since the metal is already reflective to light, no additional light-reflective coating 46 will need to be applied for these embodiments of the optical displacement sensing apparatus 10. Furthermore, since the metal will generally thick enough to block transmission of the beam 26 of lasing light, such devices 10 with a metal membrane 12 are best suited to embodiments of the present invention for which the photodetector 32 is located below the membrane 12 (see FIGS. 5-7).

In certain embodiments of the present invention, the light-reflective diffractive lens 36 can be formed on a side of the membrane 12 opposite the VCSEL 12 (i.e. above the membrane 12). Any method conventionally used to form diffractive optics can be used to form the light-reflective diffractive lens 36 on an upper surface of the membrane 12, including replication (i.e. molding), lift-off, wet or dry etching, or ion milling.

As an example, when the membrane 12 comprises a polymer material such as polyimide, mylar or TEFLON which is provided on the substrate 14, the diffractive lens structure can be formed in the polymer material by pressing a master having a mirror image of the diffractive lens structure to be formed in the membrane 14 against the polymer material and thereby molding the diffractive lens structure in the membrane material. This molding process can be performed with or without heating of the substrate 14. The diffractive lens structure can then be overcoated with a metal coating as described previously to complete the light-reflective diffractive lens 36. An opening 20 can then be formed through the substrate 14 as previously described with reference to FIGS. 4E and 4F.

As another example, when the membrane 12 comprises a transparent material such as silicon dioxide or silicon nitride, the diffractive lens structure can be formed by wet or dry etching, or by ion milling. The diffractive lens structure can then be overcoated with metal to form the light-reflective diffractive lens 36; and the opening 20 can be etched through the substrate 14 from the backside thereof. When silicon nitride is used to form the diffractive lens structure above the membrane 12, the layer 38 shown in FIGS. 4A-4F can be omitted, if desired. If silicon dioxide is used to form the membrane 12, then the layer 38 can comprise silicon nitride which can be removed beneath the membrane by an etching step (e.g. with a selective wet etchant or by reactive ion etching) after forming the opening 20.

Those skilled in the art will understand that any of the methods conventionally used to form diffractive optics can be used to form the diffractive lens structure in the optical displacement sensor 10 of the present invention. Such methods for forming diffractive optics are disclosed, for example, in an article by C. Arnone et al., entitled "Fabrication of Diffractive Optics: Surface Reliefs and Artificial Dielectrics" in *Diffractive Optics and Optical Microsystems* (S. Martellucci and A. N. Chester, eds., Plenum Press, New York, 1997), which is incorporated herein by reference.

Returning to FIG. 3, in this example of the present invention, the photodetector 32 is located above the membrane 12 to detect a portion of the beam 26 of lasing light which is transmitted through a partially-transmitting and partially-reflecting diffractive lens 36. This diffractive lens 36, which focuses a reflected portion of the beam 26 of lasing light back to the VCSEL 16, can also focus a transmitted portion of the beam 26 into the photodetector 32. The exact focusing characteristics of the diffractive lens 36 will depend on the focal-length of the lens 36 and on the spacing between the lens 36 and the VCSEL 16 (i.e. the cavity length of the second optical cavity 30). In other embodiments of the present invention, the photodetector 32 can be located on the substrate 18 beneath the VCSEL 16 as shown in FIG. 2, with the diffractive lens 36 then generally being totally reflecting.

FIG. 5 shows another arrangement for the photodetector 32 as an annular photodetector 32 which at least partially surrounds the VCSEL 16. In this fourth example of the optical displacement sensor 10 of the present invention, the annular photodetector 32 can be formed in the substrate 18, can be formed separately and attached to the substrate 18 (e.g. with an adhesive or by eutectic bonding), or can be formed on a compound semiconductor substrate whereon the VCSEL 16 is epitaxially grown (e.g. as a compound semiconductor p-n or p-i-n photodetector, or as a resonant cavity photodetector). The use of an annular photodetector 32 eliminates the need for a partially-transmitting bottom mirror 24 for the VCSEL 16 as shown in the example of FIG. 2.

When formed as a resonant cavity photodetector 32, the annular photodetector 32 can utilize the same epitaxial layer structure used for the VCSEL 16 except that the number of DBR layers in the output mirror 24' can be reduced to broaden the wavelength response of the photodetector 32. The resonant cavity photodetector 32 operates under reverse bias conditions to detect the lasing light incident thereon; whereas the VCSEL 16 operates under forward bias conditions to generate the lasing light. An annular isolation trench can be etched at least partway down through the epitaxial layer structure to separate the VCSEL 16 and the resonant cavity photodetector 32, with the isolation trench then being filled with an opaque material to eliminate the detection of any sidelight emitted by the VCSEL 16.

The formation of resonant cavity photodetectors formed adjacent to or surrounding VCSELs is well-known in the art and need not be described herein in great detail. See e.g. U.S. Pat. No. 5,978,401. See also D. K. Serkland et al., "Monolithic Integration of Vertical-Cavity Surface-Emitting Lasers and Wavelength-Shifted Resonant-Cavity Photodetectors," *Proceedings the Lasers and Electro-Optics Society (LEOS) Annual Meeting*, pp. 566-567, (November 2001); K. M. Geib et al., "High Density Interleaved VCSEL-RCPD Arrays for Optical Information Processing," *Proceedings of the Society of Photo-Optical Instrumentation Engineers (SPIE)*, vol. 4942, pp. 207-212, (2003).

In the example of FIG. 5, the location of the photodetector 32 adjacent to the VCSEL 16 allows a reflected portion 26" of the beam 26 of lasing light which extends outside the VCSEL 16 to be detected to generate an electrical output signal containing information about any movement of the membrane 12 in response to a sensed sound, vibration, pressure change or acceleration. Generally only a fraction (e.g. one-tenth) of the beam 26 needs to be reflected back into the VCSEL 16 to provide optical feedback for coupling of the two cavities 28 and 30 so that movement of the membrane 12 will alter the lasing characteristics of the VCSEL 16. The remainder of the reflected light beam 26" which lies outside the VCSEL 16 would otherwise be wasted except for the annular photodetector 32 being located about the VCSEL 16.

In the example of FIG. 5, a spacer 48 is also shown located between the substrates 14 and 18. The thickness of the spacer 48 can be selected to provide a predetermined cavity length for the second optical cavity 30 beyond the thickness provided by the substrate 14, and can also be used to provide a predetermined size for the reflected beam 26" on the VCSEL 16 and annular photodetector 32 in order to control the coupling of the two cavities 28 and 30. The spacer 48 can be formed from a material such as silicon, glass, fused silica, sapphire or ceramic, which can be optionally metallized to facilitate attaching the substrates 14 and 18 to the spacer 48 by eutectic bonding. Alternately, the substrates 14 and 18 can be attached to the spacer 48 using an adhesive such as an epoxy or polyimide.

Figure 6:
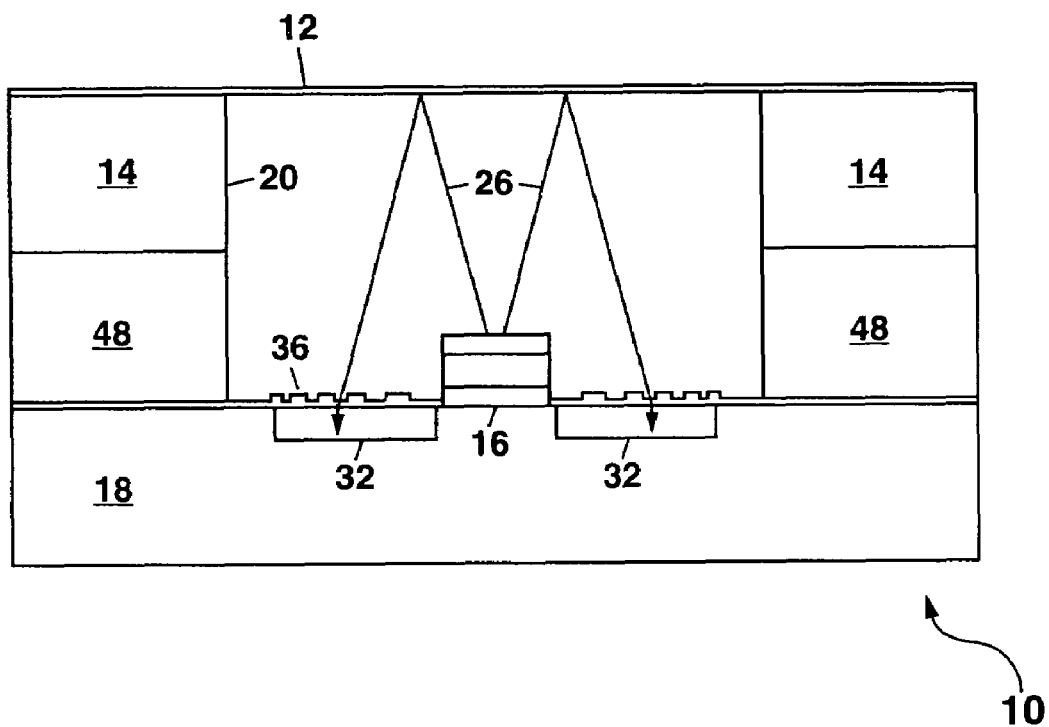
FIG. 6 shows a schematic cross-section view of a fifth example of the optical displacement sensing apparatus of the present invention.

FIG. 6 shows a schematic cross-section view of a fifth example of the optical displacement sensing apparatus 10 of the present invention. In the example of FIG. 6, a light-reflective diffractive lens 36 is located on the same substrate 18 as the VCSEL 16. In this device 10, the second optical cavity 30 is a folded cavity formed by a combination of the output mirror 24' of the VCSEL 16, the diffractive lens 36, and the diaphragm 12. The beam 26 of lasing light from the VCSEL 16 is reflected off a surface of the membrane 12 and therefrom to the diffractive lens 36 where a portion of the beam 26 is reflected back along the same path and into the VCSEL 16. This provides a cavity length for the second optical cavity 30 which is more than twice the cavity length of the device 10 in FIG. 5 for the same thickness of the spacer 48 and substrate 14.

In the example of FIG. 6, the membrane 12 can comprise a metal (e.g. aluminum or gold) or can include a metal coating to provide a high reflectivity for reflecting the beam 26 of lasing light. Additionally, the diffractive lens 36 can include a partially-transmitting metal coating which allows a portion of the beam 26 to be transmitted through the diffractive lens 36 to an underlying photodetector 32 (e.g. an annular photodetector) formed in the substrate 18 (e.g. a silicon substrate, or a silicon-on-insulator substrate having a p-n or p-i-n junction formed therein). The transmitted portion of the beam 26 of lasing light is indicated in FIG. 6 by the downward facing arrows.

In FIG. 6, the diffractive lens 36 can be, for example, a binary diffractive lens which is formed over the substrate 18 after the photodetector 32 is formed therein. The diffractive lens 36 can be formed by depositing a layer of silicon dioxide or silicon nitride over the substrate 18, forming an etch mask over that layer with openings where the silicon dioxide or silicon nitride is to be removed, and then etching the diffractive lens structure by reactive ion etching. The diffractive lens structure can be coated with a partially-transmitting layer of metal (e.g. aluminum or gold) with a layer thickness up to a few tens of nanometers to complete the diffractive lens 36. Fabrication of the diffractive lens 36 can take place prior to attaching the VCSEL 16 to the substrate 18.

Alternately, the diffractive lens 36 can be formed by molding into a layer of a polymer material such as polyimide, mylar, TEFLON, etc. which has been formed or coated over the substrate 18 after forming the photodetector 32 therein. The diffractive lens 36 can also be formed as a separate element (e.g. a replicated annular polymer disc) and attached to the substrate 18 using an adhesive (e.g. epoxy).

Figure 7:
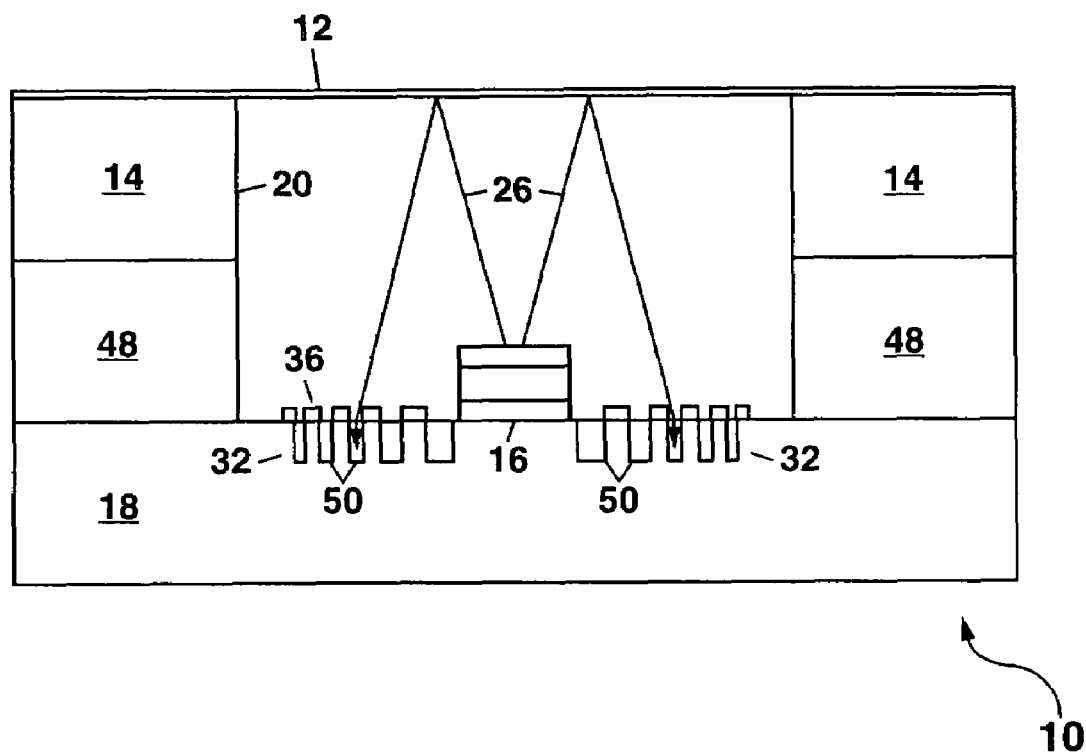
FIG. 7 shows a schematic cross-section view of a sixth example of the optical displacement sensing apparatus of the present invention.

An alternative embodiment similar to that of FIG. 6 but with a segmented photodetector 32 is schematically illustrated in FIG. 7. In this sixth example of the optical displacement sensing apparatus 10 of the present invention, the segmented photodetector 32 comprises a plurality of independently-contacted photodetector segments 50 which can be annular in shape to at least partially surround the VCSEL 16. Each photodetector segment 50 can be located at a predetermined location (e.g. between adjacent rings of the diffractive lens 36) to detect a portion of the beam 26 of the lasing light which is transmitted through the diffractive lens 36 at the location of each photodetector segment 50. This can provide a spatially-dependent measure of any changes in intensity of the beam 26 with a deflection of the membrane 12. Additionally, as the membrane 12 moves the shape of the beam 26 incident on the diffractive lens 36 can change; and this, too, can be sensed with the segmented photodetector 32.

The various examples of the optical displacement sensor 10 described herein can be batch fabricated and separated as individual devices 10 which can have an overall square or rectangular shape in plan view with lateral dimensions generally being up to a few millimeters (e.g. 1-6 mm). Additionally, a one- or two-dimensional array of optical displacement sensors 10 can be fabricated on common substrates 14 and 18. Such an array of optical displacement sensors 10 can be useful for many different applications including sensing the direction that a sound or vibration is coming from (e.g. for detecting the location of a sniper). Such an array can also provide very good phase matching between the individual sensors 10 in the array due to the reproducibility provided by batch fabrication.

In other embodiments of the present invention, the light-reflective diffractive lens 36 can be made polarization sensitive to reflect a particular polarization state of the lasing light back into the VCSEL 16, or to rotate the polarization of the reflected portion of the lasing light with a movement of the membrane 12. These changes in polarization of the optical feedback into the VCSEL 16 provided by the second optical cavity 30 can affect the polarization of the lasing within the VCSEL 16. These changes in polarization with movement of the membrane 12 can be sensed, for example, by placing a linear polarizer in front of the photodetector 32 to convert the changes in polarization of the lasing light in the VCSEL 16 into changes in intensity of a detected portion of the beam 26 of the lasing light.

In yet other embodiments of the present invention, a chemically-selective coating can be applied over the membrane 12 to affect movement of the membrane 12 due to a change in mass of the membrane 12 brought about by the adsorption or desorption of chemicals into the chemically-selective coating. The chemically-selective coating can comprise any type of chemically-selective coating known to the art including sol-gel coatings, carbon-loaded coatings, and zeolite coatings. This can be useful to operate the optical displacement sensing apparatus 10 as a chemical sensor.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An optical displacement sensing apparatus, comprising:
   (a) a vertical-cavity surface-emitting laser (VCSEL) further comprising a first optical cavity with an active region therein to produce a beam of lasing light;

(b) a membrane located proximate to the VCSEL to receive the beam of lasing light and to reflect a portion of the beam of lasing light back into the VCSEL through an output mirror of the VCSEL, with the membrane and the output mirror forming a second optical cavity which is coupled to the first optical cavity to produce a change in intensity of the beam of lasing light in response to a displacement of the membrane; and (c) a photodetector to detect the change in intensity of the beam of lasing light from the VCSEL and to generate therefrom an electrical output signal which varies with the displacement of the membrane.

2. The apparatus of claim 1 wherein the second optical cavity has a cavity length which is in the range of 0.1-3 millimeters.

3. The apparatus of claim 1 wherein the membrane comprises a material selected from the group of materials consisting of silicon dioxide, silicon nitride, silicon, metals, polymers and combinations thereof.

4. The apparatus of claim 1 wherein the membrane comprises a diffractive lens structure formed on one side of the membrane.

5. The apparatus of claim 4 wherein the membrane further includes a metal coating formed over the diffractive lens structure.

6. The apparatus of claim 4 wherein the membrane further includes a metal coating formed on a side of the membrane opposite the diffractive lens structure.

7. The apparatus of claim 1 wherein the membrane is suspended on a substrate.

8. The apparatus of claim 7 wherein the VCSEL is located on another substrate, with the two substrates being attached together.

9. The apparatus of claim 8 wherein the photodetector is located on the same substrate as the VCSEL.

10. The apparatus of claim 1 wherein the photodetector is located on a side of the membrane opposite the VCSEL.

11. The apparatus of claim 1 wherein the photodetector comprises an annular photodetector at least partially surrounding the VCSEL.

12. An optical displacement sensing apparatus, comprising:

(a) a vertical-cavity surface-emitting laser (VCSEL) further comprising a first optical cavity with an active region therein to produce a beam of lasing light;

(b) a light-reflective diffractive lens located proximate to the VCSEL to receive the beam of lasing light and to reflect a portion of the beam of lasing light back into the VCSEL through an output mirror of the VCSEL, with the light-reflective diffractive lens and the output mirror forming a second optical cavity which is coupled to the first optical cavity to produce a change in intensity of the beam of lasing light in response to a displacement of the light-reflective diffractive lens; and (c) a photodetector to detect the change in intensity of the beam of lasing light from the VCSEL and to generate therefrom an electrical output signal which varies with the displacement of the light-reflective diffractive lens.

13. The apparatus of claim 12 wherein the light-reflective diffractive lens comprises a membrane having a diffractive lens structure formed on one side of the membrane.

14. The apparatus of claim 13 wherein the membrane further includes a metal coating formed over the diffractive lens structure.

15. The apparatus of claim 13 wherein the membrane further includes a metal coating formed on a side of the membrane opposite the diffractive lens structure.

16. The apparatus of claim 13 wherein the membrane comprises a material selected from the group of materials consisting of silicon dioxide, silicon nitride, silicon, metals, polymers and combinations thereof.

17. The apparatus of claim 13 wherein the membrane is suspended on a substrate.

18. The apparatus of claim 17 wherein the VCSEL is located on another substrate, with the two substrates being attached together.

19. The apparatus of claim 18 wherein the photodetector is located on the same substrate as the VCSEL.

20. The apparatus of claim 12 wherein the photodetector comprises an annular photodetector at least partially surrounding the VCSEL.

21. The apparatus of claim 12 wherein the photodetector is located on a side of the light-reflective diffractive lens opposite the VCSEL.

22. An optical displacement sensing apparatus, comprising:

(a) a light-reflective diffractive lens formed on a substrate;

(b) a vertical-cavity surface-emitting laser (VCSEL) further comprising a first optical cavity with an active region therein to produce a beam of lasing light, with the VCSEL being located on the substrate proximate to the light-reflective diffractive lens;

(c) a membrane suspended above the VCSEL to receive the beam of lasing light and to reflect a portion of the beam of lasing light to the light-reflective diffractive lens and therefrom back into the VCSEL through an output mirror of the VCSEL, with the light-reflective diffractive lens and the membrane and the output mirror together forming a second optical cavity which is coupled to the first optical cavity to produce a change in intensity of the beam of lasing light in response to a displacement of the membrane; and (d) a photodetector to detect the change in intensity of the beam of lasing light from the VCSEL and to generate therefrom an electrical output signal which varies with the displacement of the membrane.

23. The apparatus of claim 22 wherein the membrane comprises a material selected from the group of materials consisting of silicon dioxide, silicon nitride, silicon, metals, polymers and combinations thereof.

24. The apparatus of claim 22 wherein the light-reflective membrane is suspended on another substrate which is attached to the substrate containing the light-reflective diffractive lens.

25. The apparatus of claim 22 wherein the photodetector is located beneath the light-reflective diffractive lens.

26. The apparatus of claim 25 wherein the photodetector comprises a segmented photodetector having a plurality of independently-contacted photodetector segments.

* * * * *